US010815995B2

(12) United States Patent
Heo et al.

(10) Patent No.: US 10,815,995 B2
(45) Date of Patent: Oct. 27, 2020

(54) CLUSTER ASSEMBLY AND ELECTRIC COMPRESSOR COMPRISING SAME

(71) Applicant: Hanon Systems, Daejeon (KR)

(72) Inventors: Jeong Gil Heo, Daejeon (KR); Shinji Tagami, Daejeon (KR); Bong Kyun Seo, Daejeon (KR)

(73) Assignee: Hanon Systems, Daejeon (KR)

( * ) Notice: Subject to any disclaimer, the term of this patent is extended or adjusted under 35 U.S.C. 154(b) by 5 days.

(21) Appl. No.: 16/327,021

(22) PCT Filed: Mar. 14, 2017

(86) PCT No.: PCT/KR2017/002718
§ 371 (c)(1),
(2) Date: Feb. 21, 2019

(87) PCT Pub. No.: WO2018/038339
PCT Pub. Date: Mar. 1, 2018

(65) Prior Publication Data
US 2019/0203715 A1 Jul. 4, 2019

(30) Foreign Application Priority Data

Aug. 25, 2016 (KR) .................. 10-2016-0108057

(51) Int. Cl.
*H02K 3/50* (2006.01)
*H02K 11/00* (2016.01)
(Continued)

(52) U.S. Cl.
CPC ............ *F04C 23/02* (2013.01); *F04C 29/00* (2013.01); *F04C 29/005* (2013.01);
(Continued)

(58) Field of Classification Search
CPC ............ H02K 3/06; H02K 5/22; H02K 11/25
(Continued)

(56) References Cited

U.S. PATENT DOCUMENTS

2011/0058973 A1* 3/2011 Yamada ............... H01R 13/533
418/55.1
2015/0263581 A1* 9/2015 Yamamoto ............... H02K 5/02
310/43

FOREIGN PATENT DOCUMENTS

JP H05-47448 U 6/1993
JP 2015183668 A 10/2015
(Continued)

OTHER PUBLICATIONS

Machine Translation WO2015146677 (Year: 2015).*
Machine Translation KR20140095798 (Year: 2014).*

*Primary Examiner* — Jose A Gonzalez Quinones
(74) *Attorney, Agent, or Firm* — Norton Rose Fulbright US LLP; James R. Crawford

(57) ABSTRACT

The present invention relates to a cluster assembly and an electric compressor comprising the same and, more particularly, to a cluster assembly which has an improved insulation structure and is convenient to install, and an electric compressor comprising the same. More specifically, the cluster assembly comprises: three terminals; a detachable cluster including first to third coil fixing portions each having a coil insertion hole into which a coil end is insertedly formed therein, and first to third terminal receiving portions having a space formed therein so as to be spaced apart from the first to third coil fixing portions by a predetermined distance in the longitudinal direction of the coil and receive the terminals; and a cluster body which is coupled to one side surface of an electric motor in an axial direction and is formed hollow in the center thereof along the outer circumferential surface of a stator and which includes a cluster insertion portion formed corresponding to the shape of the detachable cluster so that the detachable cluster can be inserted in a horizontal direction.

11 Claims, 8 Drawing Sheets

(51) Int. Cl.
    *H02K 5/22*           (2006.01)
    *F04C 23/02*         (2006.01)
    *F04C 29/00*         (2006.01)

(52) U.S. Cl.
    CPC .......... *F04C 29/0085* (2013.01); *H02K 3/50* (2013.01); *H02K 5/22* (2013.01); *H02K 5/225* (2013.01); *H02K 11/00* (2013.01); *F04C 2240/30* (2013.01); *F04C 2240/40* (2013.01)

(58) Field of Classification Search
    USPC .................................. 310/71, 216.005, 234
    See application file for complete search history.

(56) References Cited

FOREIGN PATENT DOCUMENTS

| | | | | |
|---|---|---|---|---|
| KR | 20110036958 A | | 4/2011 | |
| KR | 20130002268 A | | 1/2013 | |
| KR | 20140095798 A | * | 8/2014 | |
| KR | 20140095798 A | | 8/2014 | |
| WO | WO-2015146677 A1 | * | 10/2015 | .............. F04B 35/04 |

\* cited by examiner

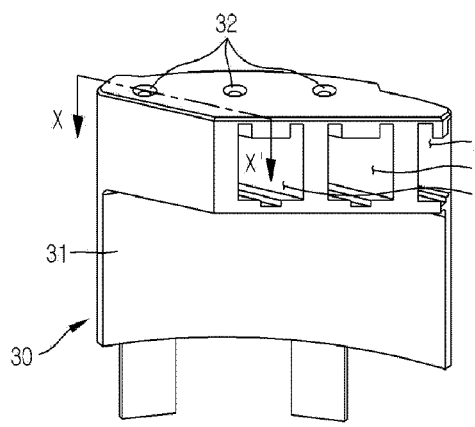
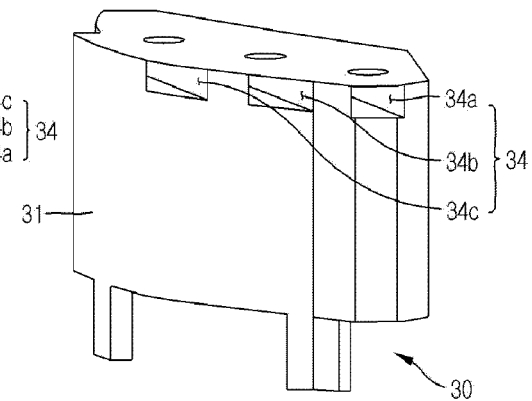
Fig. 2A    Fig. 2B
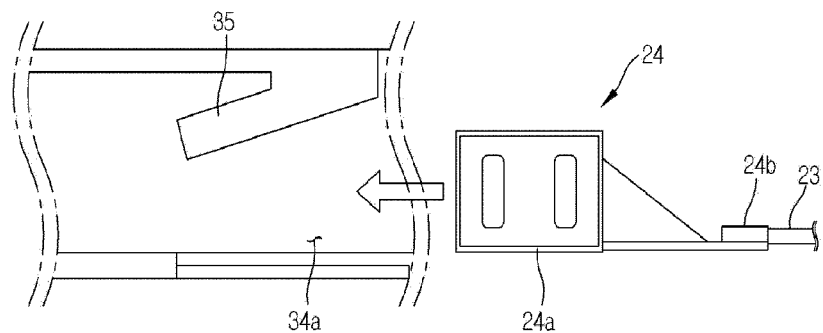
Fig. 2C

[FIG. 5]

[FIG. 7]
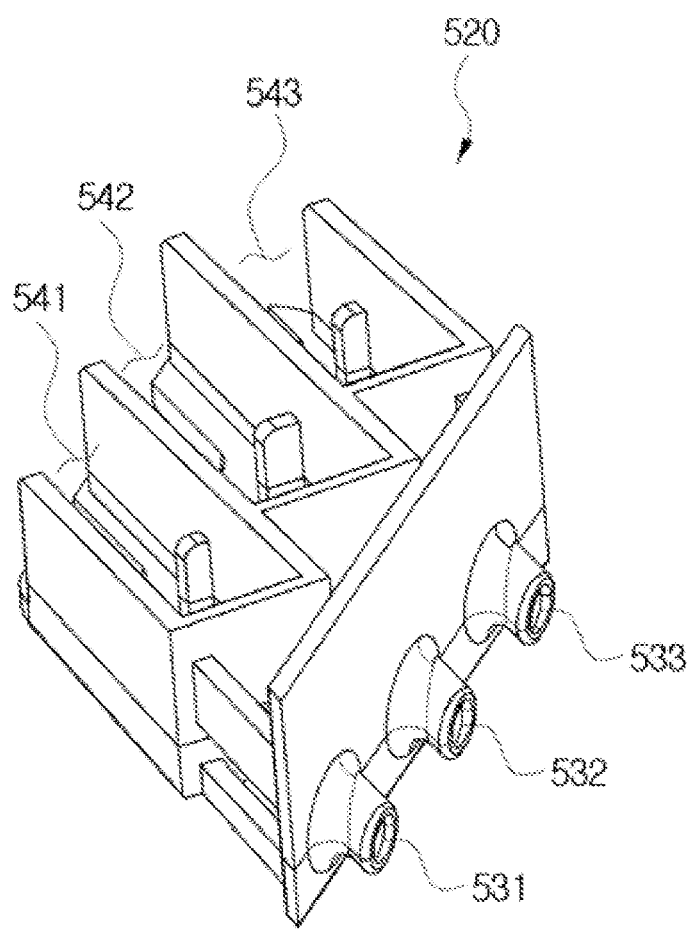

[FIG. 8]
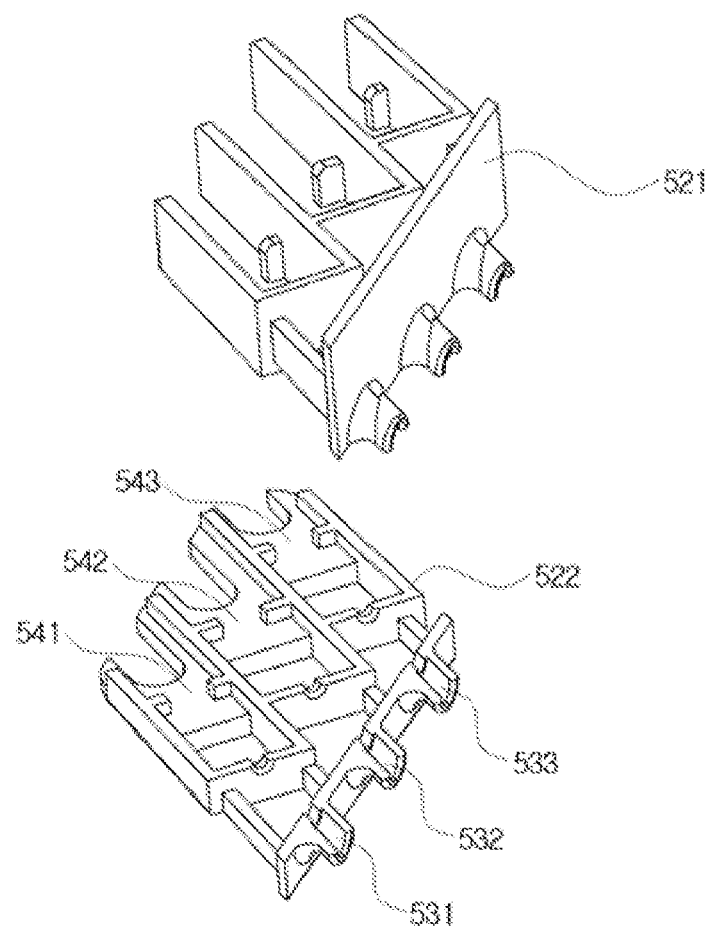

CLUSTER ASSEMBLY AND ELECTRIC COMPRESSOR COMPRISING SAME

RELATED APPLICATIONS

This application is a national phase under 35 U.S.C. § 371 of International Application No. PCT/KR2017/002718 filed Mar. 14, 2017, which claims the benefit of priority from Korean Patent Application No. 10-2016-0108057 filed Aug. 25, 2016 in the Republic of Korea. The entire contents of these applications are incorporated herein by reference in their entirety.

TECHNICAL FIELD

The present invention relates to a cluster assembly and an electric compressor including the same, and more particularly, to a cluster assembly that has an improved insulation structure and is easily equipped and an electric compressor including the same.

BACKGROUND ART

In accordance with a low pollution and high fuel efficiency policy due to the depletion of fossil fuels and environmental pollution, hybrid vehicles or electric vehicles, which use both fossil fuel and electricity as a driving source, are recently highlighted, and researches for the hybrid vehicles or the electric vehicles are actively performed.

The hybrid vehicle or the electric vehicle obtains power for driving the vehicle through an electric motor. Accordingly, unlike a case in which a mechanical compressor is widely used in a heating, ventilation and air conditioning (HVAC) system of the vehicle, a recent trend is changed to a case in which an electric compressor is used in the HVAC system.

The electric compressor is configured to include an electric motor that converts electrical energy into mechanical energy, and an inverter that controls a rotation of the electric motor. Such an electric motor of the electric compressor is generally configured to include a cylindrical rotor and a stator on which a coil surrounding an outer circumference of the rotor is wound. In this case, as current flows in the coil by the power supplied from the inverter, the rotor rotates, rotation force of such a rotor is transferred to a rotation shaft, and a mechanical means that receives the mechanical energy from the rotation shaft performs a reciprocating motion or a rotating motion to thereby compress a refrigerant.

Accordingly, a terminal for receiving an output signal from the inverter and a housing for fixing the terminal are provided at an end portion of the coil of the electric compressor.

FIGS. 1 and 2 are views illustrating a stator and a motor terminal housing included in a conventional electric compressor. Referring to FIGS. 1 and 2, the electric motor includes a cylindrical stator 10 surrounding an outer circumference of a rotor (not illustrated).

The stator 10 has a hollow cylindrical shape and the rotor is installed in the stator 10 so as to penetrate through the stator 10 in a shaft direction.

The coils are wound on the slot formed in an inner circumference of the stator, and in particular, the coils wound to be parallel to the shaft direction of the stator 10 along the slot are exposed to the outside of the stator 10 from both ends of the stator 10 in the shaft direction thereof.

As such, a portion formed by the coils exposed from the both ends of the stator 10 in the shaft direction thereof is referred to as a coil end 20, and in more detail, based on a direction illustrated in the drawing, an upper end portion is referred to as an upper coil end 21 and a lower end portion is referred to as a lower coil end 22.

In addition, the coils are led from the coil ends 20 so that three-phase (U, V, W phase) power for driving the electric motor is supplied from a motor driving circuit and three terminals 24 are provided to end portions of the coils, and a terminal housing 30 fixing the three terminals 24 is configured to be installed removably to the stator 10.

Meanwhile, the terminal housing 30 is formed of a single member of an electrical insulating material, and three terminal slots 34 into which the three terminals 24 are inserted are formed to penetrate through an integrated-type housing body 31. Each of the three terminals 24 includes a connection portion 24b and a terminal body portion 24a for fixing a coil end portion 23, and in a state in which the coil end portion 23 is connected with the connection portion 24b, the terminal body portion 24a may be separately inserted into the terminal slot 34 and fixed to the terminal housing 30. A terminal hole 32 into which a connection pin (not shown) electrically connecting the terminal body portion 24a with the motor driving circuit is inserted is formed at a position corresponding to a position that the terminal body portion 24a is fixed to the terminal slot 34.

In addition, fixing flaps 35 are included inside the three terminal slots 34. The fixing flaps 35 are extended to have a predetermined angle with respect to a horizontal direction toward a lower end surface from an upper end surface of the terminal slot 34 and are formed in a flap shape having predetermined elasticity to thereby serve as a stopper preventing the inserted terminals 24 from being separated in a direction opposite to the insertion.

However, the terminal housing 30 is formed by exposing individual terminal slots 34a, 34b, and 34a into which the terminals 24 are inserted to the outside of the housing body 31.

In such a configuration, there is a high possibility that a refrigerant existing in a gas or liquid state in the compressor is directly in contact with the terminals 24 and current leaks through the refrigerant, and there is a high possibility that weakness of insulating ability between the three terminals 24 is caused.

Further, since the electric compressor having the terminal housing equipped on an outer circumference surface as illustrated in FIG. 1 has the size of the package increased externally by the size of the terminal housing, it has a disadvantage that it should have more space for the increased size.

DISCLOSURE

Technical Problem

An object of the present invention is to provide a cluster assembly that has an improved insulation structure of a cluster connected to end portion of coils led from a stator of an electric motor of a compressor and is easily equipped in the electric motor, and an electric compressor including the same.

Technical Solution

In one general aspect, a cluster assembly includes three terminals 510 provided to end portions of coils 230 led from the coils 230 wound on a stator 210 of an electric motor 200; a detachable cluster 520 including first to third coil fixing parts 531, 532, and 533 in which insertion holes of the coils 230 into which the end portions of the coils 230 are inserted are formed, and first to third terminal accommodating parts 541, 542, and 543 spaced apart from the first to third coil fixing parts 531, 532, and 533 by a predetermined distance in a length direction of the coils 230 and having a space formed therein to accommodate the terminals 510; and a cluster body 560 coupled to one side surface of the electric motor 200 in a shaft direction of the electric motor 200, having a shape in which the center is hallowed along an outer circumference surface of the stator 210, and including a cluster inserting part 564 protruding to correspond to a shape of the detachable cluster 520 so that the detachable cluster 520 is inserted in a horizontal direction.

The detachable cluster 520 may have upper and lower separated structures and may be formed by a combination of an upper cluster 521 and a lower cluster 522.

In the detachable cluster 520, an insulating molding member may be filled in the spaces spaced between the first to third coil fixing parts 531, 532, and 533 and the first to third terminal accommodating parts 541, 542, and 543.

In the detachable cluster 520, heat shrinkable tubes may be each coupled to the end portions of the coils 230 positioned on outer side surfaces of the first to third coil fixing parts 531, 532, and 533.

The cluster body 560 may be seated on an insulator positioned on one side surface in a shaft direction.

The cluster body 560 may include at least one fixing protrusion 561 extended in the shaft direction from a predetermined region on an outer circumference surface.

The cluster body 560 may include at least one lead wire fixing part 562 protruded in a ring shape from a surface positioned at one side in the shaft direction.

The cluster body 560 may include at least one refrigerant passage hole 563 penetrating therethrough so that a refrigerant flows therethrough.

The cluster body 560 may include first to third leading holes 571, 572, and 573 through which regions from which three coils 230 are led from the coils 230 wound on the stator 210 penetrate.

In another general aspect, an electric compressor is provided in which the cluster assembly 500 is seated on one side surface of the electric motor 200 in the shaft direction thereof.

The electric motor 200 may have a fixing slot 211 formed in an outer circumference surface of the stator 210 so that a fixing protrusion 561 extending in a shaft direction from an outer circumference surface of the cluster body 560 is inserted.

The electric motor 200 may have a concentrated winding type stator 210.

Advantageous Effects

Accordingly, the cluster assembly according to the exemplary embodiment of the present invention has advantages that it has the improved insulation structure of the cluster connected to the end portions of the coils led from the stator of the electric motor of the compressor and is easily equipped in the electric motor.

In particular, in the cluster according to the exemplary embodiment of the present invention, the region in which the insertion holes of the coils into which the end portions of the coils are inserted are formed and the space in which the terminals are accommodated are formed to be spaced apart from each other, and the insulating molding member is filled between the region and the space, thereby making it possible to prevent the refrigerant from flowing into the inside of the terminals and to prevent a short circuit.

Further, the cluster having the separated upper and lower structures may be configured so that the process of connecting the coil and the terminals is easily performed, thereby shortening the assembling time and reducing the manufacturing cost.

Further, according to the present invention, the cluster includes the detachable cluster and the cluster body, the cluster body is coupled to the stator while surrounding one side surface of the core of the stator in the shaft direction thereof, and the space in which the detachable cluster may be inserted is formed inside the cluster body, thereby making it possible to easily equip the cluster assembly to the electric motor and to minimize the package to a compact structure.

Further, there is an advantage that a separate fixing means for fixing the core led from the stator is not further provided, because a lead wire fixing part of a ring shape is formed integrally with the cluster body.

DESCRIPTION OF DRAWINGS

FIGS. 1 and 2 are views illustrating a stator and a motor terminal housing included in a conventional electric compressor.

FIG. 7 is a perspective view illustrating a detachable cluster in the cluster assembly according to an exemplary embodiment of the present invention.

FIG. 8 is an exploded perspective view illustrating the detachable cluster in the cluster assembly according to an exemplary embodiment of the present invention.

BEST MODE

Hereinafter, a cluster assembly and an electric compressor including the same according to exemplary embodiments of the present invention as described above will be described in detail with reference to the accompanying drawings.

Figure 1:
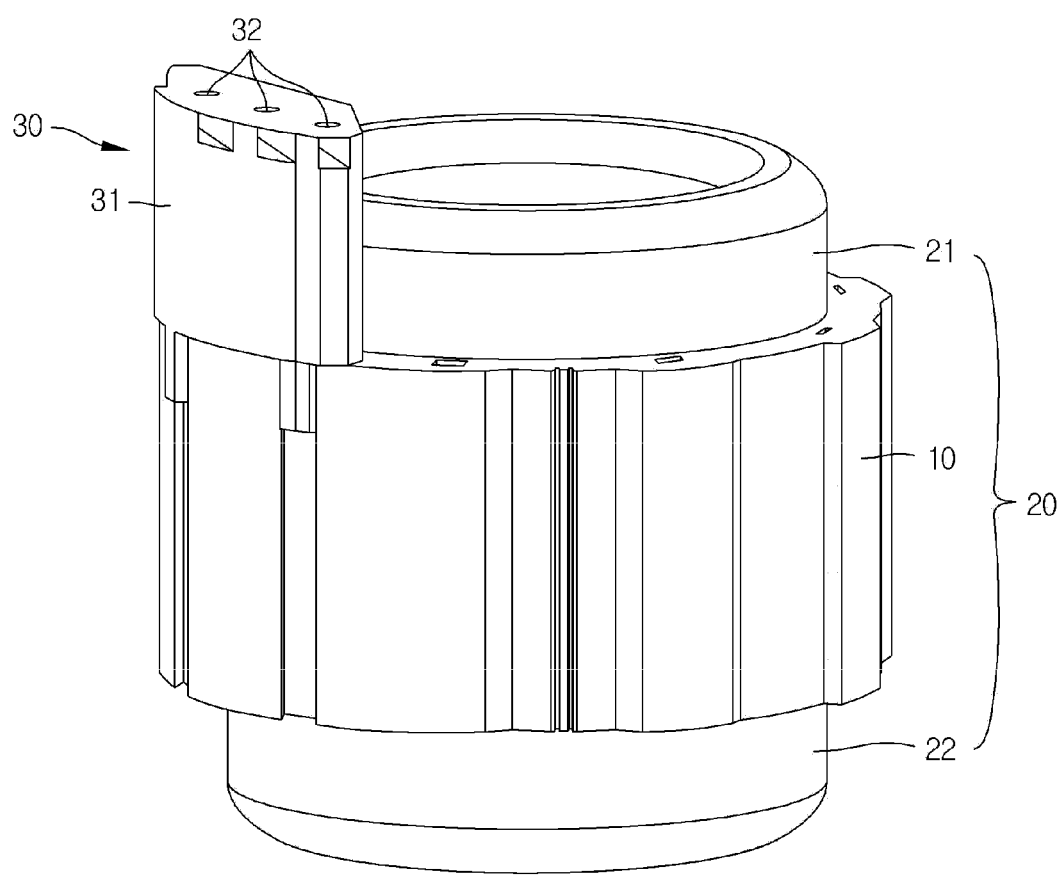
Figure 3:
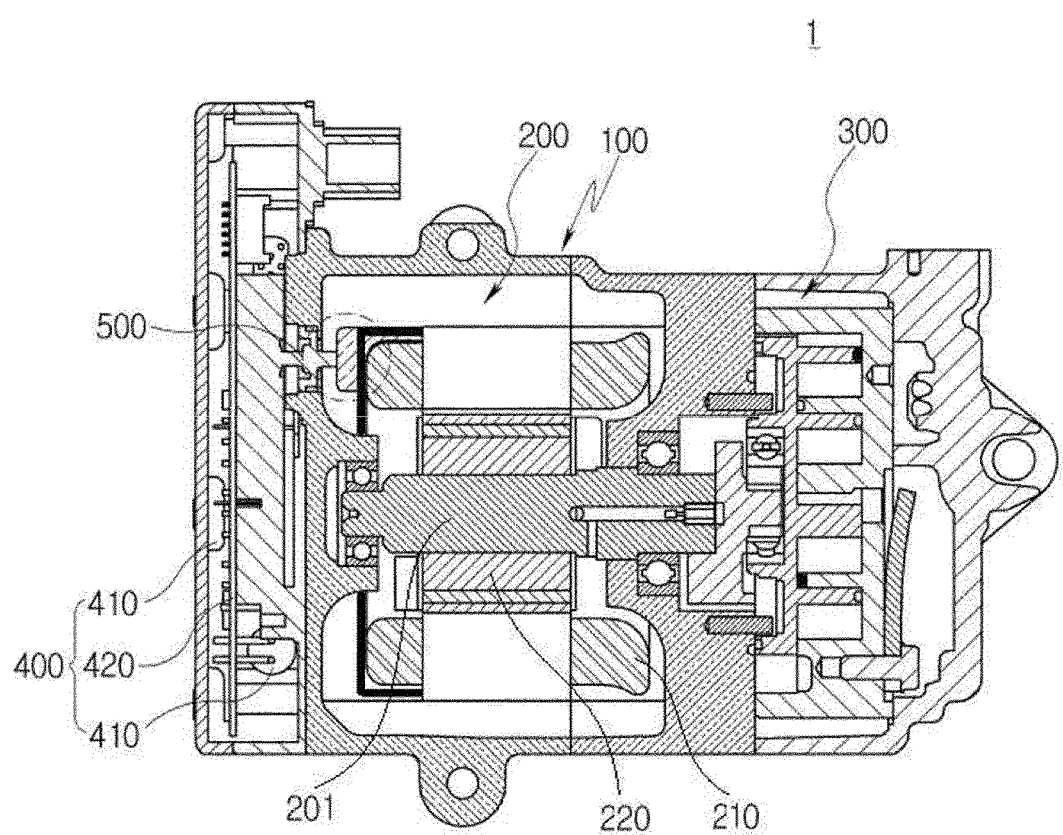
FIG. 3 is a cross-sectional view illustrating an electric compressor according to an exemplary embodiment of the present invention.

First, FIG. 3 is a cross-sectional view illustrating an electric compressor according to the present invention.

Referring to FIG. 3, an electric compressor according to an exemplary embodiment of the present invention is an electric compressor including an electric motor 200 accommodated in a housing 100, a compression mechanism part 300 accommodated in the housing 100 and driven by the electric motor 200, and a motor driving circuit 400 for supplying power to the electric motor 200.

Here, the electric motor 200 is configured to include a stator 210 having a hallow cylindrical shape in which a plurality of terminal slots on which coils 230 are wound are formed, a rotor 220 rotated in the stator 210 when power is supplied to the coils 230, and a cluster assembly 500 provided to end portions of the coils 230, fixing a plurality of terminals which are electrically connected to the motor driving circuit 400, and attached to the stator 210.

Here, a winding type of the stator of the electric motor may be both a concentrated winding type and a distributed winding type, but is preferably the concentrated winding type in which regions protruding upwardly and downwardly from the stator have a short length and winding resistance is small.

The housing 100 has a predetermined space formed therein and the space accommodates the electric motor 200 and the compression mechanism part 300. The housing 100 includes a first housing accommodating the compression mechanism part 300 and a second housing accommodating the electric motor 200, and the first housing and the second housing may be formed integrally with each other, or may also be formed separately from each other as illustrated in FIG. 3.

The housing 100 is preferably formed of a metal material, particularly, an aluminum based material having certain rigidity and relatively low weight.

The compression mechanism part 300, which is a part receiving rotation driving power generated by the electric motor 200 from a driving shaft 201 to compress the refrigerant, is configured to include a rotary scroll receiving the rotation power from the driving shaft 201 inside the first housing and is rotatably equipped, and a fixed scroll paired with the rotary scroll and compressing the refrigerant to discharge the compressed refrigerant to the outside of the compressor.

FIG. 3 illustrates a scroll type compressor including the rotary scroll and the fixed scroll, but the present invention is not limited thereto and other types of compression mechanisms such as a swash plate type may also be applied.

The electric motor 200, which is a driving source generating rotation power of the electric compressor, is configured to include a stator 210 fixedly coupled to the inside of the second housing, a rotor 220 positioned inside the stator 210, and a driving shaft 201 for transferring rotation power of the stator 210 to the compression mechanism part 300 to be described below.

The stator 210, which is a driving part generating the rotation driving power together with the rotor 220, is a kind of electromagnet and includes a core fixed and equipped on an inner circumference surface of the second housing by press-fitting, or the like, and a coil wound on the core.

As illustrated in FIG. 3, the core, which is a hallow cylindrical member, has a through hole into which the rotor 220 is inserted coaxially with the driving shaft 201, and a plurality of ribs protrude inwardly in a radial direction of the core and are arranged at a predetermined interval in a circumferential direction of the core on the inner circumference surface of the core to form the through hole.

Meanwhile, the rotor 220, which is a part equipped and rotated coaxially with an inside through hole of the stator 210, is rotatably inserted into the through hole of the center of the core of the stator 210 and includes the driving shaft 201 arranged along the center shaft and a permanent magnet attached to an outer circumference surface of the driving shaft 201. The driving shaft 201 may be formed integrally with the rotor 220, or may also be provided as a separate member.

By such a configuration, the rotor 220 is rotationally driven by interaction with the stator 210 according to a driving principle of the motor when the stator 210 is excited.

The motor driving circuit 400 is configured to include a circuit board 420 including a variety of circuit elements 410, where a variety of driving circuits and elements mounted on the circuit board are operated by being supplied with power from a power line of an external power source applied through a terminal which is electrically connected to a connection terminal, thereby supplying power to the electric motor 200 and controlling an operation of the electric motor 200.

Figure 4:
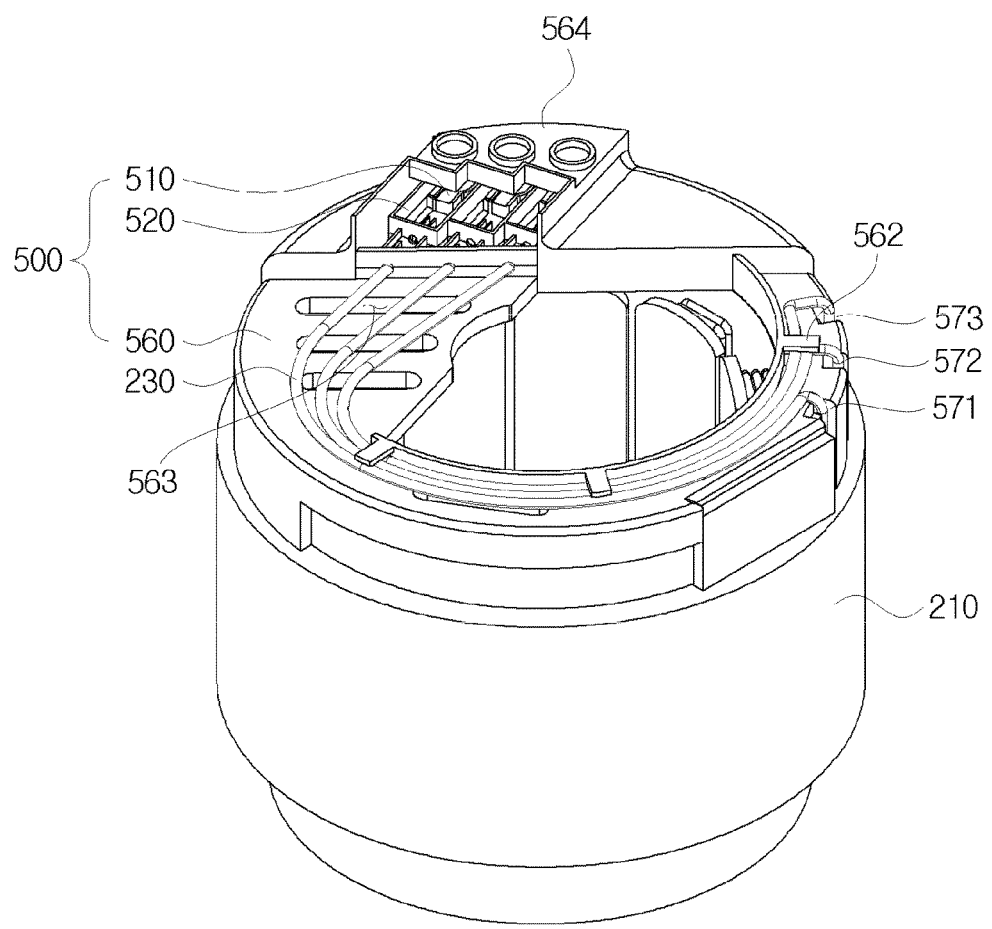
FIGS. 4 and 5 are perspective views illustrating an electric motor equipped with a cluster assembly according to an exemplary embodiment of the present invention in different directions.
Figure 5:
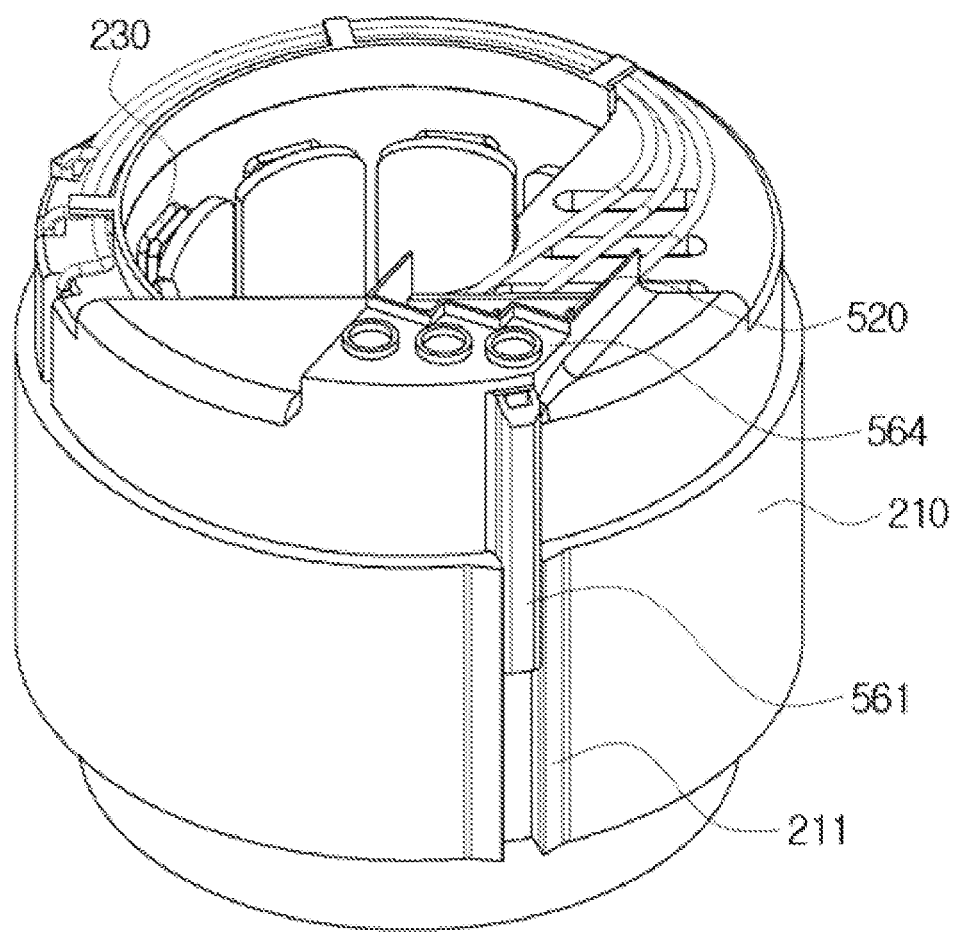

Meanwhile, as illustrated in FIGS. 4 and 5, a cluster assembly 500 according to an exemplary embodiment of the present invention is formed to include three terminals 510 provided to the end portions of the coils 230 led from the coils 230 wound on the stator 210 of the electric motor 200, a detachable cluster 520 in which the terminals 510 are accommodated, and a cluster body 560 coupled to one side surface of the electric motor 200 to insert the detachable cluster 520 so that the detachable cluster 520 is fixed to one side surface of the electric motor 200.

More specifically, the terminals 510 are led from the coils 230 wound on the stator 210 and are provided to the end portions of the coils 230 in order to receive three-phase (U, V, W phase) power for driving the electric motor from the motor driving circuit.

The terminals 510 are electrically connected to positions where the end portions of the coils 230 wound on the stator 210 are held, and are generally coupled to the positions through clamping.

Next, as illustrated in FIG. 7, the detachable cluster 520 includes first to third coil fixing parts 531, 532, and 533 in which insertion holes of the coils 230 into which the end portions of the coils 230 are inserted are formed, and first to third terminal accommodating parts 541, 542, and 543 spaced apart from the first to third coil fixing parts 531, 532, and 533 by a predetermined distance in a length direction of the coils 230 and having a space formed therein to accommodate the terminals 510.

Here, as illustrated in FIG. 8, the detachable cluster 520 has upper and lower separated structures and is formed by a combination of an upper cluster 521 and a lower cluster 522.

The upper cluster 521 and the lower cluster 522 are formed by separating the detachable cluster 520 in upper and lower directions with respect to the center portion of the insertion hole of the coil 230, and the upper cluster 521 and the lower cluster 522 may be combined by various methods such as separate combining means or bonding means.

In the detachable cluster 520, in a state in which the upper cluster 521 and the lower cluster 522 are separated from each other, the coils 230 of front end regions of the terminals 510 of the end portions of the coils 230 to which the terminals 510 are coupled are put in the insertion holes of the coils 230, the terminals 510 are disposed to be accommodated in the first to third terminal accommodating parts 541, 542, and 543, and the upper cluster 521 and the lower cluster 522 are then combined with each other.

Here, in the detachable cluster 520, heat shrinkable tubes are each coupled to the end portions of the coils 230 positioned on outer side surfaces of the first to third coil fixing parts 531, 532, and 533, thereby making it possible to further increase insulating property and bonding property.

Accordingly, the detachable cluster 520 has an advantage in that it is very easy to assemble because it does not need to form flaps or to form separate hooks to accommodate the end portions of the coils 230 connected to the terminal 510.

The first to third coil fixing parts 531, 532, and 533 and the first to third terminal accommodating parts 541, 542, and 543 corresponding to the first to third coil fixing parts 531, 532, and 533 are components in which the three end portions of the coils 230 and terminals 510 to which the three-phase (U, V, W phase) power is supplied are each coupled, and the respective components may also be formed as separate structures and then coupled to each other so as to be disposed at an appropriate position, or integrally formed from the beginning.

Next, the cluster body 560 is coupled to the electric motor 200 while surrounding one side surface of the electric motor 200 in a shaft direction thereof, is formed in a form in which the center thereof is hallowed along an outer circumference surface of the stator 210, and includes a cluster inserting part protruding to correspond to the shape of the detachable cluster 520 so that the detachable cluster 520 is inserted thereto in a horizontal direction.

Here, the cluster body 560 is seated on an insulator portion positioned on one side surface thereof in the shaft direction thereof and is preferably formed of an insulating material.

As illustrated in FIG. 5, the cluster body 560 includes one or more fixing protrusions 561 extended in the shaft direction thereof from a predetermined region on an outer circumference surface thereof.

The fixing protrusion 561 is inserted into a fixing slot 211 formed in the outer circumference surface of the stator 210 of the electric motor and slidably couples the cluster body 560 with the stator 210 in the shaft direction.

That is, the cluster body 560 is coupled and fixed to the stator 210 by the fixing slot 211, and the remaining regions thereof are seated on the insulator portion and a separate bonding means or a coupling means may also be further provided to the region seated on the insulator.

A method for coupling the cluster body 560 and the stator 210 is not limited to the above-mentioned slot type and may be changed in other types.

Figure 6:
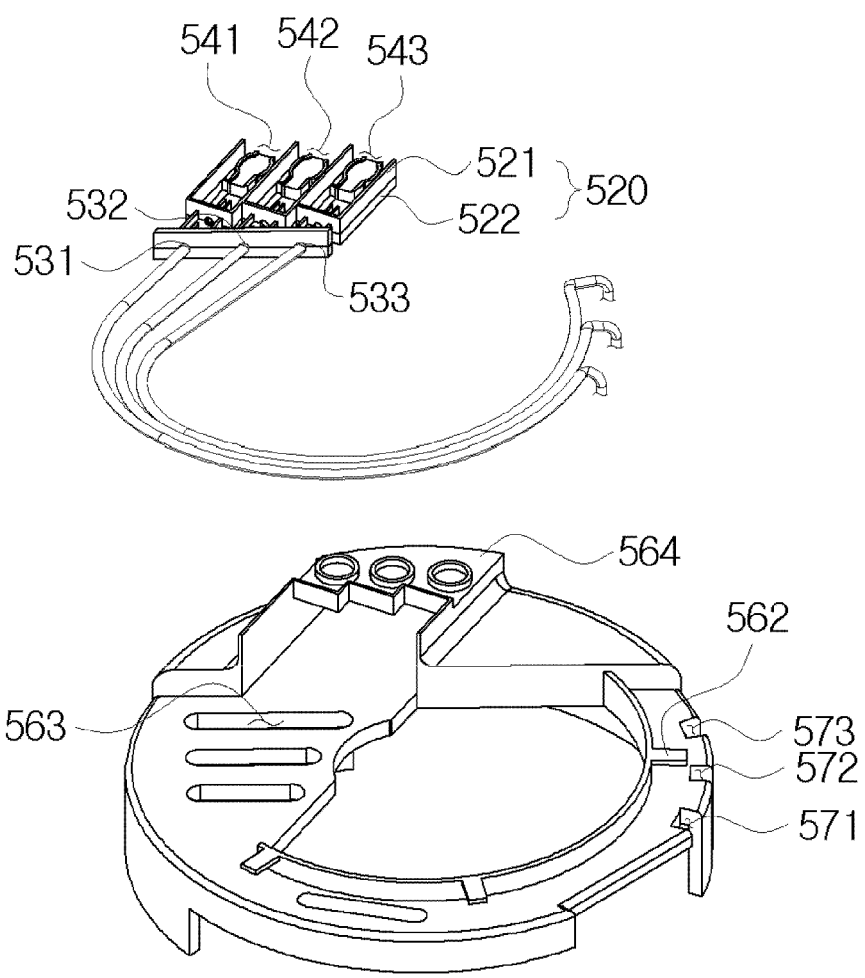
FIG. 6 is a perspective view illustrating a cluster body in the cluster assembly according to an exemplary embodiment of the present invention.

Further, the cluster body 560 further includes at least one lead wire fixing part 562 protruded in a ring shape from a surface positioned one side thereof in the shaft direction thereof, that is, from an upper surface of FIGS. 4 to 6 such that the coils 230 led from the coils 230 wound on the stator 210 may be fixed to predetermined positions on the upper surface of the cluster body 560 until they are inserted into the cluster inserting parts of the cluster body 560.

In addition, the cluster body 560 is preferably formed to include at least one refrigerant passage hole 563 penetrating therethrough so that a refrigerant flows therethrough.

Further, the cluster body 560 may be formed to include first to third leading holes 571, 572, and 573 through which regions from which the three coils 230 are led from the coils 230 wound on the stator 210 penetrate.

As illustrated in FIGS. 4 and 5, the first to third leading holes 571, 572, and 573 are disposed to be spaced apart from each other by a predetermined interval in a circumferential direction, such that the three coils 230 may be led from core regions on which they are each wound.

Accordingly, according to the present invention, the cluster includes the detachable cluster 520 and the cluster body 560, the cluster body 560 is coupled to the stator 210 while surrounding one side surface of the core of the stator 210 in the shaft direction thereof, and the space in which the detachable cluster 520 may be inserted is formed inside the cluster body 560, thereby making it possible to easily equip the cluster assembly to the electric motor 200 and to minimize the package to a compact structure.

Further, in the cluster according to the exemplary embodiment of the present invention, the region in which the insertion holes of the coils 230 into which the end portions of the coils 230 are inserted are formed and the space in which the terminals 510 are accommodated are formed to be spaced apart from each other, and the insulating molding member is filled between the region and the space, thereby making it possible to prevent the refrigerant from flowing into the inside of the terminal 510 and to prevent the short circuit.

Further, the cluster having the separated upper and lower structures may be configured so that the process of connecting the coils 230 and the terminals 510 is easily performed, thereby shortening the assembling time and reducing the manufacturing cost.

The present invention is not limited to the above-mentioned embodiments but may be variously applied, and may be variously modified by those skilled in the art to which the present invention pertains without departing from the gist of the present invention claimed in the claims.

DETAILED DESCRIPTION OF MAIN ELEMENTS

1: electric compressor
100: housing
200: electric motor
201: driving shaft
210: stator
211: fixing slot
220: rotor
230: coil
300: compression mechanism part
400: motor driving circuit
410: circuit element
420: circuit board
500: cluster assembly
510: terminal
520: detachable cluster
521: upper cluster
522: lower cluster
531, 532, 533: first to third coil fixing parts
541, 542, 543: first to third terminal accommodating parts
560: cluster body
561: fixing protrusion
562: lead wire fixing part
563: refrigerant passage hole
564: cluster inserting part
571, 572, 573: first to third leading holes

The invention claimed is:

1. A cluster assembly comprising:
three terminals provided to end portions of coils led from the coils wound on a stator of an electric motor;
a detachable cluster including first to third coil fixing parts in which insertion holes of the coils into which the end portions of the coils are inserted are formed, and first to third terminal accommodating parts spaced apart from the first to third coil fixing parts by a predetermined distance in a length direction of the coils and having a space formed therein to accommodate the terminals; and
a cluster body coupled to one side surface of the electric motor in a shaft direction of the electric motor and having a shape in which the center is hallowed along an outer circumference surface of the stator,
wherein the cluster body includes a cluster inserting part protruding to correspond to a shape of the detachable cluster so that the detachable cluster is inserted in a horizontal direction; and
at least one lead wire fixing part formed integrally with the cluster body and protruding in a ring shape from a surface positioned on one side in the shaft direction.

2. The cluster assembly of claim 1, wherein the detachable cluster has upper and lower separated structures and is formed by a combination of an upper cluster and a lower cluster.

3. The cluster assembly of claim 2, wherein in the detachable cluster, an insulating molding member is filled in the spaces spaced between the first to third coil fixing parts and the first to third terminal accommodating parts.

4. The cluster assembly of claim 3, wherein in the detachable cluster, heat shrinkable tubes are each coupled to the end portions of the coils positioned on outer side surfaces of the first to third coil fixing parts.

5. The cluster assembly of claim 1, wherein the cluster body is seated on an insulator positioned on one side surface in a shaft direction.

6. The cluster assembly of claim 5, wherein the cluster body includes at least one fixing protrusion extended in the shaft direction from a predetermined region on an outer circumference surface.

7. The cluster assembly of claim 5, wherein the cluster body includes at least one refrigerant passage hole penetrating therethrough so that a refrigerant flows therethrough.

8. The cluster assembly of claim 5, wherein the cluster body includes first to third leading holes through which regions from which three coils are led from the coils wound on the stator penetrate.

9. An electric compressor in which the cluster assembly of claim 1 is seated on one side surface of the electric motor in the shaft direction thereof.

10. The electric compressor of claim 9, wherein the electric motor has a fixing slot formed in an outer circumference surface of the stator so that a fixing protrusion extending in a shaft direction from an outer circumference surface of the cluster body is inserted.

11. The electric compressor of claim 9, wherein the electric motor has a concentrated winding type stator.

* * * * *